United States Patent
Hardy et al.

(10) Patent No.: US 10,162,175 B2
(45) Date of Patent: Dec. 25, 2018

(54) DUAL HEAD-UP DISPLAY APPARATUS

(71) Applicant: Jaguar Land Rover Limited, Coventry, Warwickshire (GB)

(72) Inventors: Robert Hardy, Coventry (GB); Eduardo Dias, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/528,913

(22) PCT Filed: Jan. 14, 2016

(86) PCT No.: PCT/EP2016/050693
§ 371 (c)(1),
(2) Date: May 23, 2017

(87) PCT Pub. No.: WO2016/113362
PCT Pub. Date: Jul. 21, 2016

(65) Prior Publication Data
US 2017/0315352 A1 Nov. 2, 2017

(30) Foreign Application Priority Data
Jan. 14, 2015 (GB) .................. 1500551.5

(51) Int. Cl.
*G09G 3/02* (2006.01)
*G02B 27/01* (2006.01)
(Continued)

(52) U.S. Cl.
CPC ..... *G02B 27/0101* (2013.01); *G02B 26/0833* (2013.01); *G02B 27/14* (2013.01);
(Continued)

(58) Field of Classification Search
None
See application file for complete search history.

(56) References Cited

U.S. PATENT DOCUMENTS 4,908,611 A  3/1990  Iino
5,781,345 A  7/1998  Ferrante et al.
(Continued)

FOREIGN PATENT DOCUMENTS

EP  2618203 A1  7/2013
EP  2618204 A1  7/2013
(Continued)

OTHER PUBLICATIONS

Combined Search and Examination Report, GB Application No. 1500551.5, dated Jul. 9 2015, 7 pages.
(Continued)

*Primary Examiner* — Gustavo D Polo
(74) *Attorney, Agent, or Firm* — Myers Bigel, P.A.

(57) ABSTRACT

The present disclosure relates to a head-up display apparatus (1). An image source (3) is provided for generating a composite image comprising a first image (IMG1) and second image (IMG2). An image splitter configured to separate the first image (IMG1) from the second image (IMG2). A first imaging assembly (5) is arranged to project the first image (IMG1) generated by the image source (3) to produce a first virtual image (VIMG1); and a second imaging assembly (7) is arranged to project the second image (IMG2) generated by the image source (3) to produce a second virtual image (VIMG2). The present disclosure also relates to a vehicle (V) incorporating a head-up display apparatus (1).

12 Claims, 6 Drawing Sheets

(51) Int. Cl.
  *G02B 26/08* (2006.01)
  *G02B 27/14* (2006.01)
(52) U.S. Cl.
  CPC ............... *G02B 2027/0125* (2013.01); *G02B 2027/0145* (2013.01); *G09G 3/02* (2013.01); *G09G 2380/10* (2013.01)

(56) References Cited

U.S. PATENT DOCUMENTS

| | | |
|---|---|---|
| 6,750,832 B1 | 6/2004 | Kleinschmidt |
| 2003/0020880 A1 | 1/2003 | Knoll et al. |
| 2004/0085260 A1 | 5/2004 | McDavid, III |
| 2010/0253601 A1 | 10/2010 | Seder et al. |

FOREIGN PATENT DOCUMENTS

| | | |
|---|---|---|
| EP | 2669719 A1 | 12/2013 |
| GB | 2428153 A | 1/2007 |
| JP | 2010072255 A | 4/2010 |
| WO | WO 2013/104376 A1 | 7/2013 |

OTHER PUBLICATIONS

Combined Search and Examination Report, GB Application No. 1600728.8, dated Jun. 13, 2016, 7 pages.
Notification of Transmittal of the International Search Report and the Written Opinion of the International Searching Authority, or the Declaration, PCT/EP2016/050693, dated May 9, 2016.

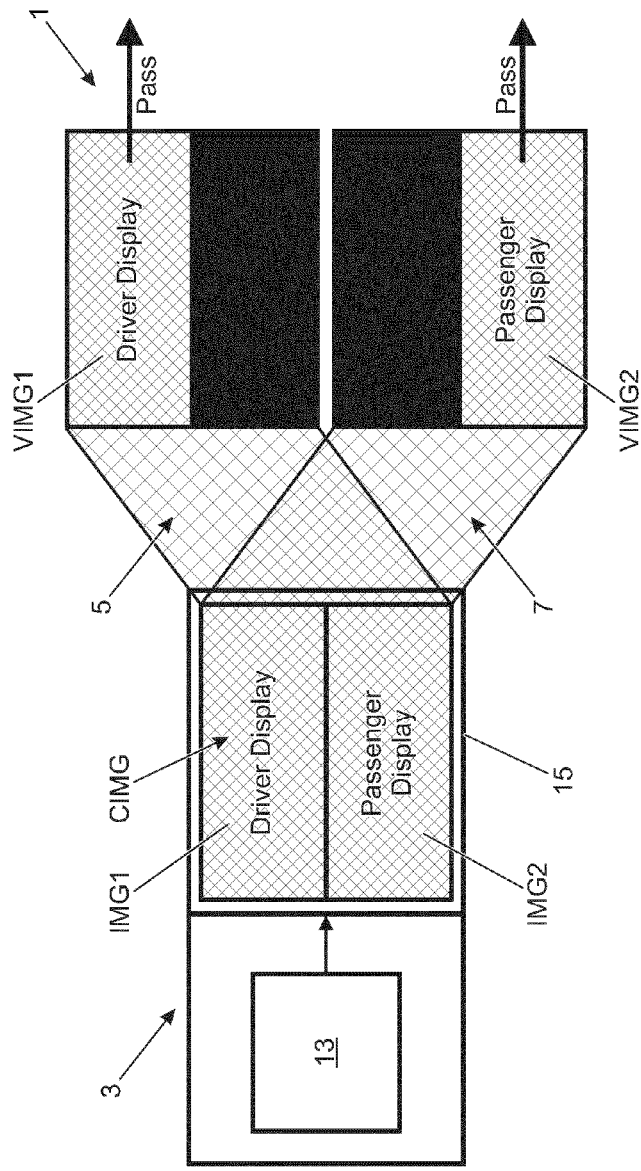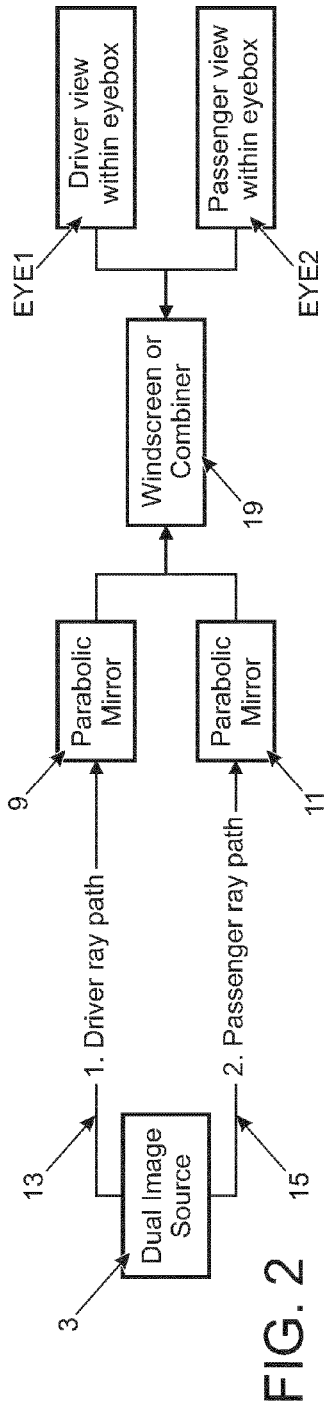
FIG. 1
FIG. 2

DUAL HEAD-UP DISPLAY APPARATUS

RELATED APPLICATIONS

This application is a 35 U.S.C. § 371 national stage application of PCT Application No. PCT/EP2016/050693, filed on Jan. 14, 2016, which claims priority from Great Britain Patent Application No. 1500551.5 filed on Jan. 14, 2015, the contents of which are incorporated herein by reference in their entireties. The above-referenced PCT International Application was published in the English language as International Publication No. WO 2016/113362 A1 on Jul. 21, 2016.

TECHNICAL FIELD

The present disclosure relates to a head-up display apparatus and particularly, but not exclusively, to a dual view head-up display apparatus for a vehicle. Aspects of the invention relate to an apparatus and to a vehicle having a head-up display apparatus.

BACKGROUND

Current automotive head-up displays (HUDs) enable the driver to view vehicle operational information, such as vehicle speed and/or navigation directions. The head-up display apparatus typically comprises a mirror assembly to produce a virtual image on a combiner. The virtual image can only be viewed by a user when their eyes are located within a virtual three-dimensional space referred to as an eyebox (or head position box). The free form (imaging) mirror corrects image error from the combiner and is configured such that the eyebox is positioned to enable the driver to view the virtual image when in a normal driving position. Due to packaging requirements in a vehicle, the size of the imaging mirror is limited and the eyebox is not accessible to a passenger in the vehicle under normal operating conditions. Thus, the passenger is unable to view the virtual image produced by the head-up display apparatus.

It is against this background that the present invention has been conceived. At least in certain embodiments, the present invention seeks to overcome or ameliorate at least some of the shortcomings associated with known head-up display apparatus.

SUMMARY OF THE INVENTION

Aspects of the present invention relate to a head-up display apparatus, and to a vehicle having a head-up display apparatus. The head-up display apparatus is suitable for automotive applications, but is not limited in this respect.

According to an aspect of the present invention there is provided a head-up display apparatus comprising an image source configured to generate a composite image comprising a first image and a second image. The apparatus comprises an image splitter configured to separate the first image and the second image from the composite image; a first imaging assembly arranged to project the first image to a first eyebox to produce a first virtual image; a second imaging assembly arranged to project the second image to a second eyebox to produce a second virtual image; and wherein the first eyebox is located at a position different to the position of the second eyebox. In this way, the head-up display apparatus according to embodiments of the present invention can generate first and second virtual images utilising a single image source. The first and second virtual images can be viewed from respective first and second eyeboxes. The head-up display apparatus can be configured such that the first virtual image can be viewed by a first user and the second virtual image viewed by a second user. The first user can be a driver of the vehicle and the second user can be a passenger. The head-up display apparatus can be configured to be used in a vehicle, such as an automobile.

The image splitter may be configured to output the first image to the first imaging assembly, and the second image to the second imaging assembly, in order to separate the first and second images from the composite image.

The head-up display apparatus can be arranged to enable the first and second users simultaneously to view separate first and second images. The first and second images can contain different information or content. Thus, the head-up display apparatus described herein can provide a dual-view function. The head-up display apparatus can, for example, be coupled to an on-board information system. The head-up display apparatus could provide a replacement to existing dual-view information screens which require the users to look at the centre console. The head-up display apparatus can provide an improved viewing angle and distance over conventional information display screens.

According to a further aspect of the present invention there is provided a head-up display apparatus comprising:
  an image source configured to generate a first image and a second image;
  a first imaging assembly arranged to project the first image generated by the image source to produce a first virtual image; and
  a second imaging assembly arranged to project the second image generated by the image source to produce a second virtual image.

The image source may function as a dual image source configured to generate both said first and second images. The light from the first imaging assembly can be projected onto a first combiner to produce the first virtual image. The light from the second imaging assembly can be projected onto a second combiner to produce the second virtual image. Thus, the head-up display apparatus according to embodiments of the present invention can generate first and second virtual images utilising a single image source. The first and second virtual images can be viewed from respective first and second eyeboxes. The head-up display apparatus can be configured such that the first virtual image can be viewed by a first user and the second virtual image viewed by a second user. The first user can be a driver of the vehicle and the second user can be a passenger. The head-up display apparatus can be configured to be used in a vehicle, such as an automobile.

The head-up display apparatus can be arranged to enable the first and second users simultaneously to view separate first and second images. The first and second images can contain different information or content. Thus, the head-up display apparatus described herein can provide a dual-view function. The head-up display apparatus can, for example, be coupled to an on-board information system. The head-up display apparatus could provide a replacement to existing dual-view information screens which require the users to look at the centre console. The head-up display apparatus can provide an improved viewing angle and distance over conventional information display screens.

The image generator functions as a light engine. The image generator can comprise one of the following set: a laser liquid crystal on silicon (LCOS), a digital light processing (DLP) device, a thin film transistor (TFT) screen, a liquid-crystal display (LCD), and a miniature laser projector.

In certain embodiments the image source may be configured to generate a composite image comprising said first and second images. The first and second images can be juxtaposed in the composite image such that they are both displayed simultaneously. The first and second mirror assemblies can be arranged to crop the composite image to form said first and virtual second images. An optical mask can be provided to separate said first and second images.

The first and second virtual images can be the same size and/or the same display resolutions. For example, the first and second images formed in the composite image can be the same size. Alternatively, the first and second virtual images can be different sizes and/or different display resolutions. For example, the first and second images formed in the composite image can have different sizes. One of said first and second images can be larger than the other image. The image source can be configured to generate the composite image from a plurality of pixels. The first and second images can be formed by the same number of pixels in the composite image; or the first and second images can be formed by different numbers of pixels in the composite image. A larger one of the first and second images can be formed from more pixels to produce a virtual image having a higher resolution. The optical properties of the first and second imaging assemblies could be different to provide different display resolutions for the first and second images.

An image splitter can be provided for splitting an image generated by the image source into said first and second images. The image source can be configured to generate an image which alternates between said first and second images. The image splitter can comprise an optical switch for controlling the output path of the image generated by the image source. The frequency at which the optical switch operates can be synchronized with the display frequency of the first and second images (typically related to the refresh rate of the image source). The first and second images can thereby be separated from the same image for output to the first and second mirror assemblies. By operating at a sufficiently high frequency, the user perceives the resulting first and second virtual images as being displayed continuously. The image source and the image splitter could be configured selectively to display one of said first and second images continuously if only one image is to be displayed by the head-up display apparatus, for example if there is no passenger in the vehicle. Alternatively, the image splitter can comprise a directional image source configured to control the output of said first and second images to the respective first and second mirror assemblies.

The first imaging assembly can comprise one or more first mirrors. The first imaging assembly can comprise a first imaging mirror arranged to reflect the first image generated by the image source. The second imaging assembly can comprise one or more second mirrors. The second imaging assembly can comprise a second imaging mirror arranged to reflect the second image generated by the image source. The first and second imaging mirrors can, for example, each comprise either a spherical, aspherical, or a free-form surface. In certain embodiments, the first and second imaging mirrors could be those installed to provide left and right hand derivatives of the vehicle. The first and second imaging mirrors can be configured to magnify the first and second images for display. The first imaging mirror and/or the second imaging mirror can be adapted to generate a first virtual image and/or a second virtual image having a virtual distance in the range of 1 meter to 4 meters (inclusive), and more specifically a virtual distance of approximately 2 meters. In an alternative arrangement, the first imaging mirror can be a collimating mirror and/or the second imaging mirror can be a collimating mirror.

The first imaging assembly can comprise a first light guide. The first light guide can be disposed between the image source and the first imaging mirror. The first light guide can comprise one or more fold mirrors for directing the light rays from the image source to the first imaging mirror. A separate optical collimator, such as a collimating lens or a collimating mirror, can be provided for collimating the image prior to introduction into the first light guide. Alternatively, the first light guide can comprise a fibre optic cable. Alternatively, the first light guide can comprise a conduit for guiding the image from the image source to the first imaging mirror. In use, the first light guide can be arranged to convey the image in a transverse direction across the vehicle.

The second imaging assembly can comprise a second light guide. The second light guide can be disposed between the image source and the second imaging mirror. The second light guide can comprise one or more fold mirrors for directing the light rays from the image source to the second imaging mirror. A separate optical collimator, such as a collimating lens or a collimating mirror, can be provided for collimating the second image prior to introduction into the second light guide. Alternatively, the second light guide can comprise a fibre optic cable. Alternatively, the second light guide can comprise a conduit for guiding the second image from the image source to the second imaging mirror. In use, the second light guide can be arranged to convey the second image in a transverse direction across the vehicle.

The first imaging assembly can be arranged to project the light onto a first optical combiner. The second imaging assembly can be arranged to project the light onto a second optical combiner. In arrangements in which the first and second imaging assemblies comprise first and second imaging mirrors, the first imaging mirror can be arranged to reflect the first image onto the first optical combiner and the second imaging mirror can be arranged to reflect the second image onto the second optical combiner.

The first and second optical combiners can be spatially separated from each other. The first and second optical combiners can be transparent or partially-transparent. For example, the optical combiners could each comprise a transparent, or partially-transparent member disposed between the windscreen and the user. The first optical combiner and/or the second optical combiner can be formed in a windscreen of the vehicle, for example by respective first and second regions having wedge-shaped sections. The first and second regions can be configured to remove ghosting artefacts from the displays. The first imaging assembly can be arranged to project the first image onto the first region of the windscreen. The second imaging assembly can be arranged to project the second image onto the second region of a windscreen. In certain implementations, the first and second optical combiners can comprise an opaque surface onto which the first and second images are projected.

According to a further aspect of the present invention there is provided a vehicle comprising a head-up display apparatus as recited in any one of the appended claims. The vehicle comprises a front windscreen (windshield). The image source can be disposed beneath the windscreen, for example in a dashboard extending transversely within a cabin of the vehicle.

The image source can be disposed beneath the windscreen, for example in the dashboard. The first imaging mirror and/or the second imaging mirror can also be disposed beneath the windscreen. A first fold mirror can be disposed above the image source for reflecting the first image to the first imaging mirror, and/or a second fold mirror can be disposed above the image source for reflecting the second image to the second imaging mirror. The first fold mirror and/or the second fold mirror can be disposed above the dashboard of the vehicle. The first fold mirror and/or the second fold mirror can, for example, be disposed behind a rear-view mirror. The rear-view mirror can be mounted to the windscreen. Alternatively, the first fold mirror and/or the second fold mirror can be disposed above the windscreen, for example mounted to a roof of the vehicle or to a cross-member extending across the top of the windscreen. The image source can be disposed centrally within the vehicle or can be offset laterally, for example to the left or right side of the vehicle.

The first and second imaging assemblies can be arranged to project the first and second images onto respective first and second combiners. In arrangements in which the first and second imaging assemblies comprise first and second imaging mirrors, the first and second imaging mirrors can be arranged to reflect the first and second images onto respective first and second combiners. The first and second combiners can be formed by first and second regions of the windscreen each having a wedge-shaped profile. Alternatively, the first and second combiners can be separate from the windscreen. The first and second combiners can be transparent or partially-transparent.

The first imaging assembly can be arranged to project the first virtual image for viewing by a driver of the vehicle. In particular, a first imaging mirror can be arranged such that a first eyebox is disposed on a driver side of the vehicle. The second imaging assembly can be arranged to project the second virtual image for viewing by a passenger of the vehicle. In particular, a second imaging mirror can be arranged such that a second eyebox is disposed on a passenger side of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which:

FIG. 1 shows a schematic representation of the head-up display apparatus in accordance with the present invention;

FIG. 2 illustrates the operation of the head-up display apparatus shown in FIG. 1;

DETAILED DESCRIPTION

Figure 3:
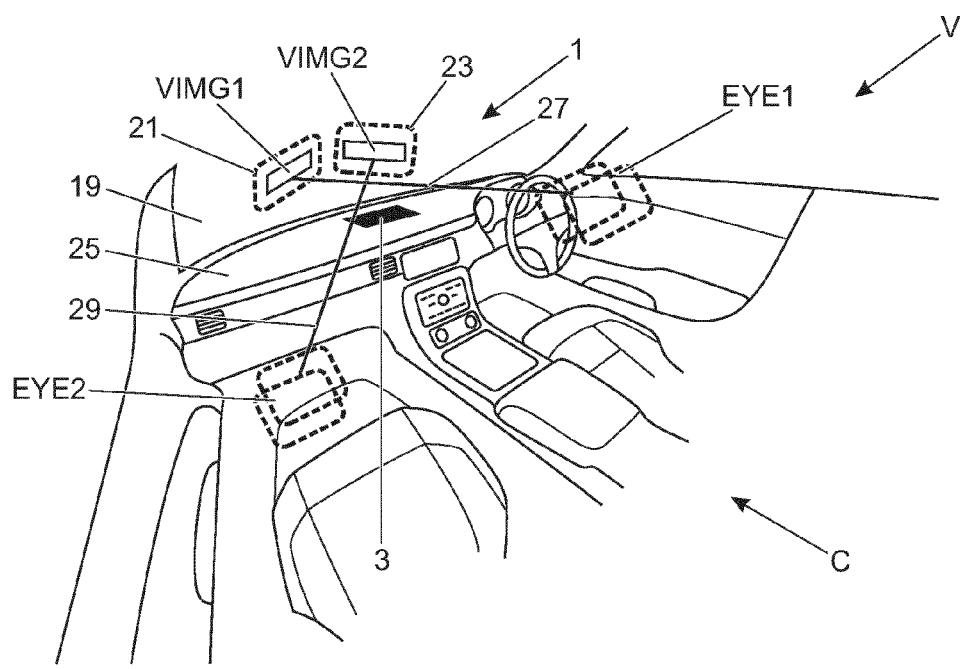
FIG. 3 shows a perspective view of an interior of a vehicle cabin incorporating the head-up display apparatus according to an embodiment of the present invention.

A head-up display apparatus 1 in accordance with one or more embodiments of the present invention will now be described with reference to the accompanying Figures. The head-up display apparatus 1 has particular application in an automotive vehicle V, such as an automobile or a sports utility vehicle (SUV), but is not limited in this respect.

A schematic representation of the head-up display apparatus 1 is shown in FIGS. 1 and 2. An image source 3 generates first and second images IMG1, IMG2 which are output to respective first and second imaging assemblies 5, 7 for projection as first and second virtual images VIMG1, VIMG2. In particular, the first and second images IMG1, IMG2 are output to first and second eyeboxes EYE1, EYE2 via first and second ray paths R1, R2. The first imaging assembly 5 comprises a first imaging mirror 9; and the second imaging assembly 7 comprises a second imaging mirror 11. The first and second imaging mirrors 9, 11 are free-form mirrors arranged to reflect light and reduce imaging errors. The image source 3 comprises a graphics processor unit 13 and an image generator 15. The graphics processor unit 13 is configured to output an image signal to the image generator 15 to generate the first and second images IMG1, IMG2. In the present embodiment the image generator comprises a light source and a liquid crystal on silicon (LCOS) device. The graphics processor unit 13 and the image generator 15 can be integrated onto a single electronic device or could be separate from each other.

Figure 4:
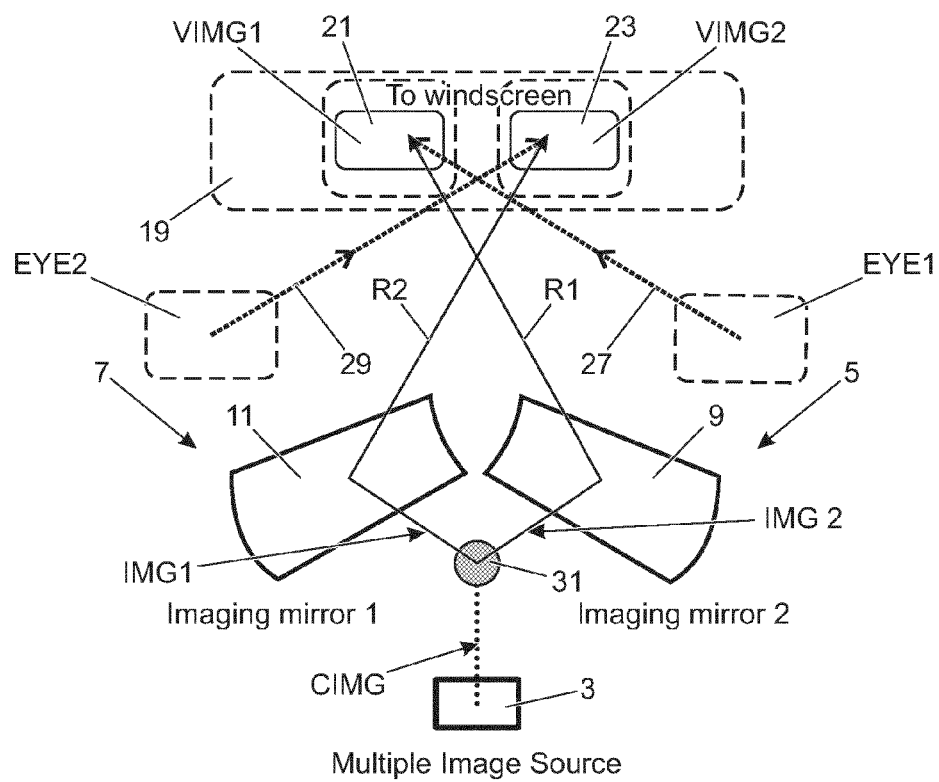
FIG. 4 shows the arrangement of the first and second imaging mirrors in the head-up display apparatus shown in FIG. 3.

As shown in FIG. 4, the vehicle V comprises a windscreen (windshield) 19 and the first and second images IMG1, IMG2 are reflected by the first and second imaging mirrors 9, 11 onto first and second regions 21, 23 thereof. The first and second regions 21, 23 of the windscreen 19 have a wedge-shaped section so as to form optical combiners. The first ray path R1 is formed between the image source 3 and the first region 21. The second ray path R2 is formed between the image source 3 and the second region 23. The light reflected by the first and second imaging mirrors 9, 11 produces first and second virtual images VIMG1, VIMG2 when incident on said first and second regions 21, 23. The first and second virtual images VIMG1, VIMG2 can be viewed from respective first and second eyeboxes EYE1, EYE2. The first and second virtual images VIMG1, VIMG2 are superimposed in a forward field of view (FOV) of the user(s). The user can thereby view the real-world scene through the windscreen 19 in combination with the first and second virtual images VIMG1, VIMG2. In an alternative arrangement, separate first and second optical combiners (not shown) can be provided for forming the first and second virtual images VIMG1, VIMG2. The first and second optical combiners can be transparent or partially-transparent to enable the user to see through them. The optical combiners can take the form of a transparent or partially-transparent plate, a curved dichroic mirror, or a volume-holographic plate. In some arrangements, the first and second optical combiners can be opaque. The first and second imaging mirrors 9, 11 are configured to reduce imaging errors on the surfaces of the associated optical combiners.

The first and second imaging assemblies 5, 7 in the present embodiment are arranged such that the first and second virtual images VIMG1, VIMG2 are spatially separated from each other for viewing by first and second vehicle occupants. The first virtual image VIMG1 can be viewed when the first occupant's eyes are positioned within a first eyebox EYE1. The second virtual image VIMG2 can be viewed when the second occupant's eyes are positioned within a second eyebox EYE2. In the illustrated arrangement, the first image IMG1 is output for viewing by a driver of the vehicle V, and the second image IMG2 is output for viewing by a passenger of the vehicle V. The first and second images IMG1, IMG2 can be modified independently of each other to enable different information to be viewed by the driver and the passenger.

The head-up display apparatus 1 can be used to display one or more of the following: vehicle operating information, such as vehicle speed; navigation information, such as route directions and/or a map; environmental information, such as outside temperature; information information, such as a radio station or track listing; communication information, such as caller information, an SMS message, or an e-mail; and road sign information or restrictions, such as an effective speed limit. The first and second virtual images VIMG1, VIMG2 could optionally also function as a virtual screen, for example to display an Internet browser or a video image. The functionality of the head-up display apparatus 1 could optionally be configured to inhibit one or more display functions when the vehicle V is in motion, for example to disable entertainment functions on the first virtual image VIMG1 which might otherwise cause a distraction for the driver.

A head-up display apparatus 1 in accordance with an embodiment of the present invention will now be described in more detail with reference to FIGS. 3, 4 and 5. A perspective view of an interior of a cabin C of the vehicle V is shown in FIG. 3. The head-up display apparatus 1 is disposed within a dashboard 25 provided beneath the windscreen 19. In particular, the head-up display apparatus 1 is disposed centrally within the dashboard 25 and arranged to produce first and second virtual images VIMG1, VIMG2 for viewing by the driver and the passenger respectively.

The first and second virtual images VIMG1, VIMG2 are visible when the eyes of the driver and the passenger are in respective first and second eyeboxes EYE1, EYE2, as shown in FIG. 3. The first and second eyeboxes EYE1, EYE2 are virtual three-dimensional spaces. The size and location of the first and second eyeboxes EYE1, EYE2 are determined by the first and second imaging mirrors 9, 11. In order to facilitate viewing of the virtual images VIMG1, VIMG2, the first and second imaging mirrors 9, 11 are arranged such that the first and second eyeboxes EYE1, EYE2 are coincident with a natural forward-facing head position of the driver and the passenger when seated in the vehicle V. In certain embodiments, the position and/or orientation of the first and second imaging mirrors 9, 11 could be adjustable to alter the position of the first and second eyeboxes EYE1, EYE2 to accommodate different drivers and passengers. The line of sight of the driver and the passenger to view the first and second virtual images VIMG1, VIMG2 are illustrated by first and second lines 27, 29 in FIG. 3.

The arrangement of the head-up display apparatus 1 is shown schematically in FIG. 4. The image source 3 is centrally located in the dashboard 25 and generates a composite image CIMG comprising the first and second images IMG1, IMG2. The optical splitter 31 (e.g. a bi-prism configuration) splits the composite image into the respective first and second images IMG1, IMG2. The optical splitter 31 can, for example, comprise first and second fold mirrors for reflecting the first and second images IMG1, IMG2 to the respective first and second imaging mirrors 9, 11. An optical mask can be provided in the optical splitter 31 to separate the first and second images IMG1, IMG2 generated by the image source 3. Alternatively, the image source 3 could be split via a display source that directs light in a given direction, for example, a Microelectromechanical system (MEMS) device or a digital micromirror device (DMD). The MEMS device or the DMD could be arranged to direct the light between the first and second imaging mirrors 9, 11 separately at a higher refresh rate (e.g. 120 Hz) to generate the first and second virtual images VIMG1, VIMG2. Thus, unwanted light in the first virtual image VIMG2 can be directed to the second imaging mirror 11 and vice versa. This alternative arrangement would benefit from retaining the resolution of the image source 3.

The first image IMG1 is output to the first imaging mirror 9 and reflected towards the windscreen 19. The second image IMG2 is output to the second imaging mirror 9 and reflected towards the windscreen 19. The reflected light from the first and second imaging mirrors 9, 11 intersects the windscreen 19 in the first and second regions 21, 23 and produces the first and second virtual images VIMG1, VIMG2. The first and second virtual images VIMG1, VIMG2 can be viewed by the driver and the passenger when their eyes are located in the respective first and second eyeboxes EYE1, EYE2. In the present embodiment, the first and second images IMG1, IMG2 are the same size and resolution within the composite image CIMG such that the resulting first and second virtual images VIMG1, VIMG2 have the same picture quality. However, the first and second images IMG1, IMG2 could have different sizes and or different resolutions within the composite image CIMG.

Figure 5:
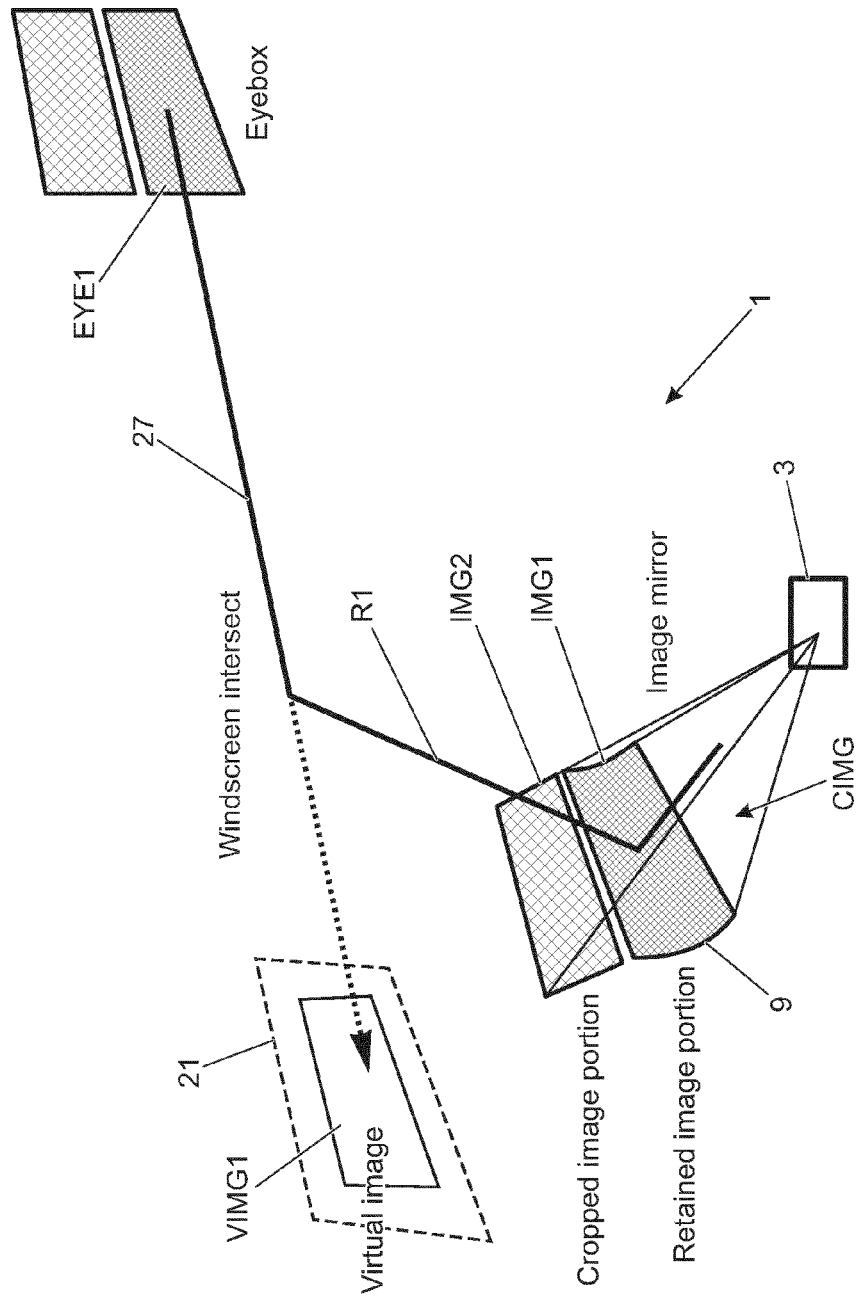
FIG. 5 shows an alternate arrangement of the first and second imaging mirrors in the head-up display apparatus shown in FIG. 3.

A modified arrangement of the head-up display apparatus 1 is shown in FIG. 5. The image source 3 generates a composite image CIMG comprising said first and second images IMG1, IMG2. In this arrangement, the first and second images IMG1, IMG2 are juxtaposed in the composite image CIMG. A space or gap can be formed between the first and second images IMG1, IMG2 within the composite image CIMG to facilitate splitting the image. As shown in FIG. 5, the first imaging mirror 9 is arranged such that only the first image IMG1 is incident thereon. The composite image CIMG is effectively cropped such that only the first image IMG1 is reflected by the first imaging mirror 9. The second imaging mirror 11 (not shown in FIG. 5) is arranged such that only the second image IMG2 is incident thereon. Thus, the second image IMG2 is reflected by the second imaging mirror 11. The first image IMG1 is reflected by the first imaging mirror 9 so as to intersect the windscreen 19 in the first region 21, thereby producing the first virtual image VIMG1. The second image IMG2 is reflected by the second imaging mirror 11 so as to intersect the windscreen 19 in the second region 23, thereby producing the second virtual image VIMG2.

A head-up display apparatus 1 in accordance with a further embodiment of the present invention will now be described with reference to FIGS. 6, 7 and 8. Like reference numerals will be used for like components when describing this embodiment of the head-up display apparatus 1.

Figure 6:
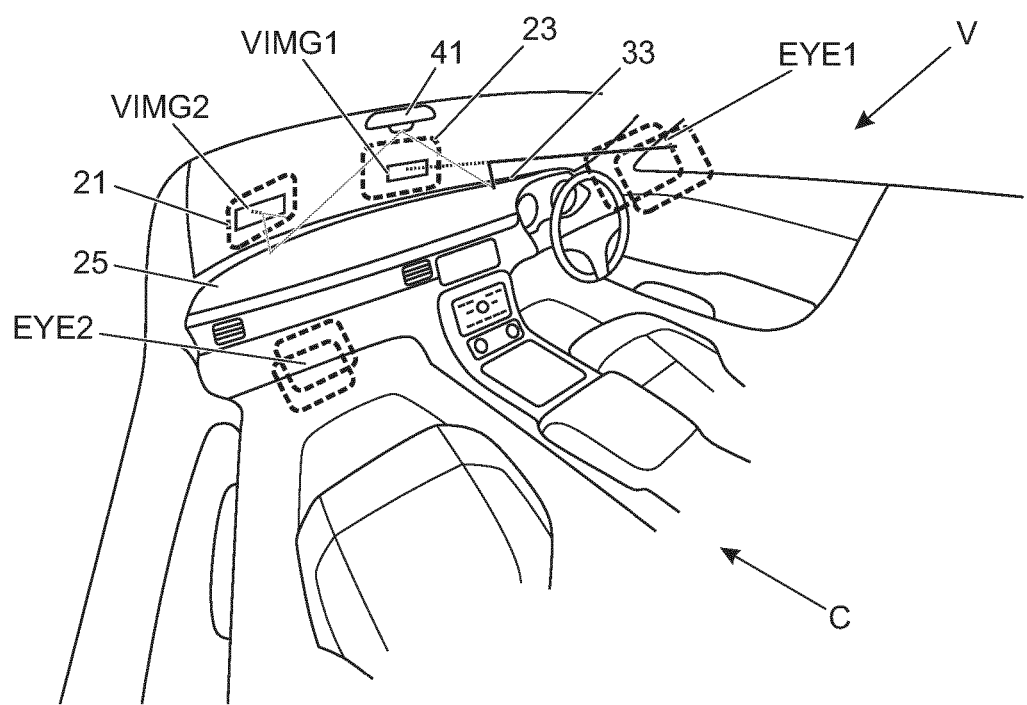
FIG. 6 shows a perspective view of an interior of a vehicle cabin incorporating the head-up display apparatus according to a further embodiment of the present invention.

A perspective view of an interior of a cabin C of the vehicle V is shown in FIG. 6. The head-up display apparatus 1 is arranged to produce first and second virtual images VIMG1, VIMG2 for viewing by the driver and the passenger respectively. The head-up display apparatus 1 is disposed within the dashboard 25. The image source 3 can be deposed at a number of locations in the dashboard 25, such as driver-side, passenger-side, and centrally. The exemplified arrangement in FIG. 6 comprises an image source 3 (not shown) laterally offset to the driver side of the dashboard 25, disposed in an instrument binnacle 33 formed in the dashboard 25 to house an instrument cluster (not shown). The first and second imaging mirrors 9, 11 are disposed on opposing sides of the dashboard 25. The first imaging mirror 9 is provided in the instrument binnacle 33 to reflect the first image IMG1 onto the first region 21 of the windscreen 19 to produce the first virtual image VIMG1 for viewing by the driver. The second imaging mirror 11 is provided on the opposite side of the dashboard 25 to project the second image IMG2 onto the second region 23 of the windscreen 19 to produce the second virtual image VIMG2 for viewing by the passenger.

The image source 3 generates a composite image CIMG comprising the first and second images IMG1, IMG2. As shown in FIG. 7, an optical splitter 31 splits the composite image CIMG into first and second beams comprising the respective first and second images IMG1, IMG2. The first image IMG1 is output to the first imaging mirror 9 and reflected towards to the first region 21 of the windscreen 19. Thus, the operation of the head-up display apparatus 1 to generate the first virtual image VIMG1 is unchanged from the first embodiment. However, rather than direct the second image IMG2 directly onto the windscreen 19, the second imaging assembly 7 comprises a light guide 35 configured to guide the second image IMG2 generated by the image source 3 to the second imaging mirror 11. The light guide 35 in the present embodiment is arranged to guide the second image IMG2 transversely across the dashboard 25 to the passenger area. The divergence of the light emitted from the image source 3 is controlled, for example the emitted light can be collimated, depending on the focusing requirements of the first image IMG1 and/or the second image IMG 2. The image source 3 can also be positioned at any point between the mirror assemblies in order to control the virtual distance of the virtual images.

Figure 7:
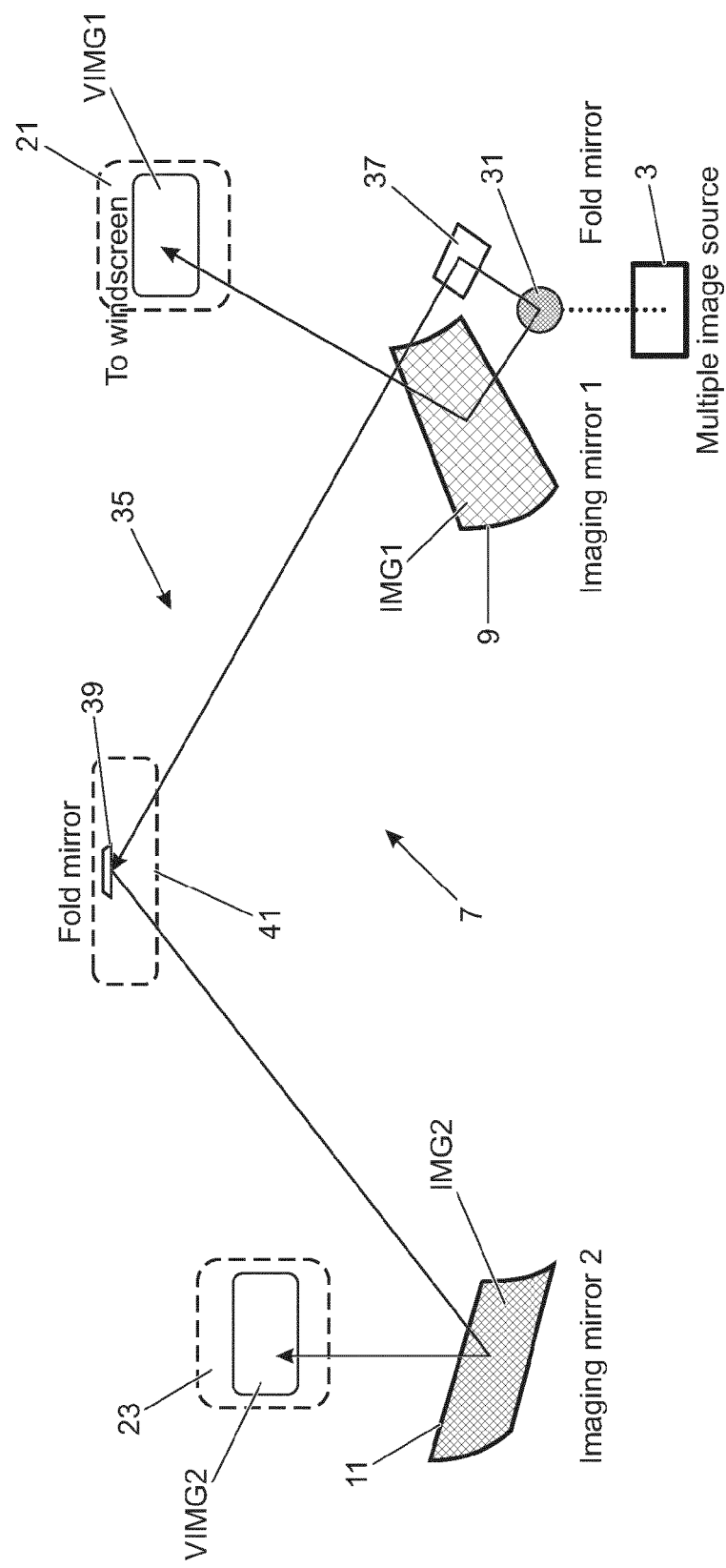
FIG. 7 shows the arrangement of the first and second imaging mirrors of the head-up display apparatus shown in FIG. 6.
Figure 8:
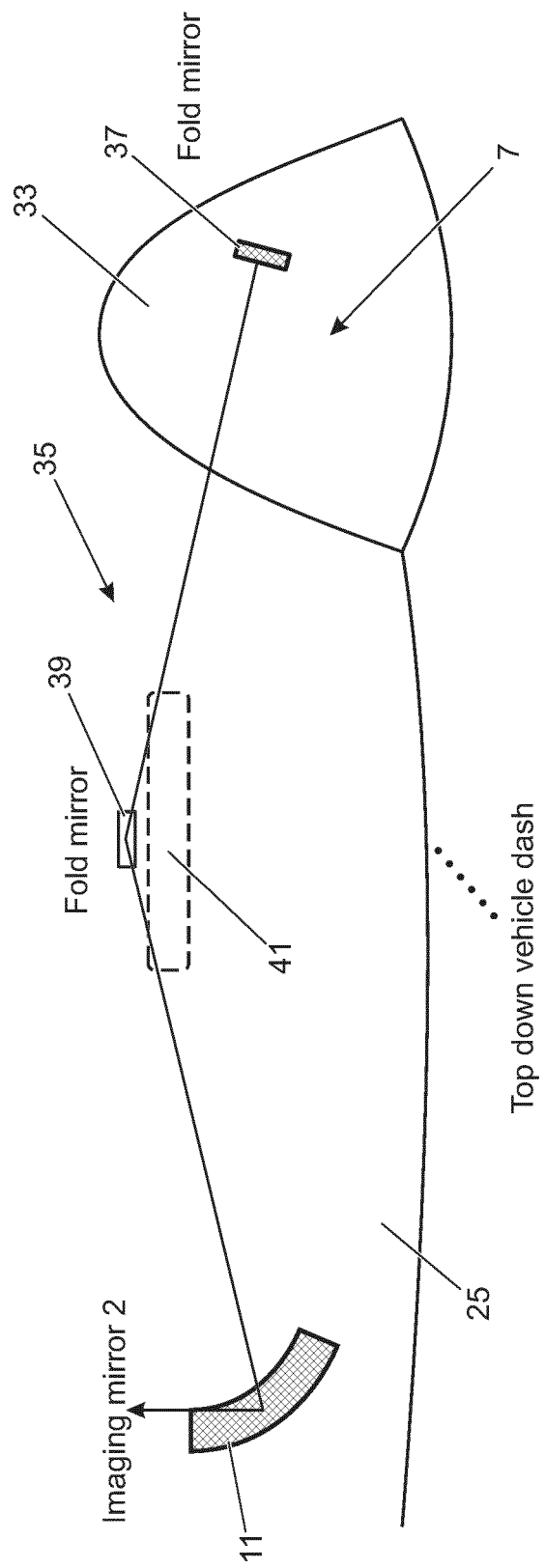
FIG. 8 shows a plan view of the light guide for the head-up display apparatus shown in FIG. 6.

As shown in FIG. 7, the light guide 35 comprises a first fold mirror 37 disposed in the instrument binnacle 33, and a second fold mirror 39 disposed behind a rear view mirror 41 mounted to the windscreen 19. Thus, the first and second fold mirrors 37, 39 can be concealed from view (by the driver and/or the passenger) under normal use conditions. The first fold mirror 37 is arranged to reflect the second image IMG2 from the optical splitter 31 to the second fold mirror 39. The second fold mirror 39 is arranged to reflect the second image IMG2 onto the second imaging mirror 11. The second imaging mirror 11 is arranged to reflect the second image IMG2 towards the windscreen 19. The reflected light intersects the second region 23 of the windscreen 19 and generates the second virtual image VIMG2. In use, the first and second virtual images VIMG1, VIMG2 can be viewed by the driver and the passenger respectively.

As illustrated by the arrows in FIG. 7, the light guide 35 provides an unobstructed pathway from the instrument binnacle 33 to the second imaging mirror 11. A plan view of the light guide 35 is shown in FIG. 8 to illustrate the relative position and orientation of the first and second fold mirrors 37, 39. The rear view mirror 41 is well suited as a mounting location for the second fold mirror 39 since its location is subject to tight tolerances during the manufacturing process. The image source 3 could be disposed centrally in the vehicle V and the first and second images IMG1, IMG2 output to first and second light guides each comprising a fold mirror mounted to the rear view mirror 41. The virtual distance can also be built up in the passenger ray path through placement of a diffuser to form the image early in the path.

It will be appreciated that various changes and modifications can be made to the apparatus described herein without departing from the scope of the present invention. For example, the light guide 35 could comprise a transversely extending conduit disposed in the dashboard 25, for example comprising one or more fold mirrors, to direct the second image IMG2 to the second imaging mirror 11. Alternatively, the light guide 35 could be transparent, for example comprising a bundle of optical fibres (not shown) for transmitting the second image IMG2 to the second imaging mirror 11. Moreover, the first imaging assembly 5 could comprise a light guide (not shown) configured to guide the first image IMG1 generated by the image source 3 to the first imaging mirror 9.

Rather than generate a composite image in which the first and second images IMG1, IMG2 are displayed simultaneously, the image source 3 could be configured to generate the first and second images IMG1, IMG2 alternately. An optical switch (not shown) could be provided to control the output of the first and second images IMG1, IMG2 to first and second channels. The optical switch can be synchronised with the alternating display such that the first and second images IMG1, IMG2 are output to the respective first and second imaging mirrors 9, 11. The optical switch can operate at a high frequency the first and second virtual images VIMG1, VIMG2 are perceived as being displayed continuously (i.e. without flicker). This arrangement enables the first and second images IMG1, IMG2 to be displayed at a higher resolution, albeit with a lower refresh rate.

For example, the optical switch may be a microelectromechanical system (MEMS). The MEMS may comprise a transmissive or a reflective structure.

Where the MEMS is a transmissive structure it may relate to a grating structure wherein one or more of a plurality of transmission apertures are selectively activated depending on which one of the first and second imaging mirrors 9, 11 the image needs to be transmitted to. In this way, by selectively activating the required transmission aperture, the transmitted optical signal can be directed to the required imaging mirror.

Where the MEMS is a reflective structure it may relate to a variable reflective grating structure. In such embodiments the structure of the MEMS is adjustable to reflect an incident light signal to either the first or second imaging mirrors 9, 11 as required. The reflective grating structure of the MEMS is selected to be reconfigurable at a rate greater than or equal to twice the image refresh rate. Within this context the image refresh rate is defined as the refresh rate of the image projected to either the passenger or the driver, and not the rate at which the image source generates images. For example, if the refresh rate of the image projected to the driver is 30 $s^{-1}$ and the refresh rate of the image projected to the passenger is also 30 $s^{-1}$, then the rate at which the image source 3 generates images is 60 $s^{-1}$. The rate at which the MEMS is configured to vary its reflective grating structure is proportional to the rate at which the image source 3 generates images. In other words, in this example the rate at which the MEMS varies its reflective grating structure is on the order of 60 s⁻¹. In this way, the MEMS is able to alternately reflect the generated image frames from the first imaging mirror 9 to the second imaging mirror 11 as required. Alternate image refresh rates may equally be used in which case the rate at which the MEMS varies its grating structure is selected proportional to the given image refresh rates.

As described previously, in embodiments where the first and second images IMG1, IMG2 may be generated simultaneously, the image source 3 may effectively be configured to generate a composite image, in which the first and second images IMG1, IMG2 may be considered the component images of the composite image. Different methods may be used to separate the first and second images IMG1, IMG2 from the composite image. For example, in addition to the aforementioned cropping method a further way in which the composite image may be separated into its component first and second images IMG1, IMG2, is to use polarisation. In such embodiments the optical splitter 31 may comprise a beam-splitting polariser configured to reflect light waves having a first polarised state, and to transmit light having a second polarised state. In this way, light waves incident on the optical splitter 31 are reflected on the basis of their state of polarisation. The pixels comprised in the image source 3 may be configured with different polarising filters, such that the pixels responsible for generating the first and second images IMG1, IMG2 are output with a different state of polarisation. For example, half of the pixels comprised in the image source 3 may be configured with a polarising filter such that the component image generated by these pixels is polarised with a specific polarisation state, whilst the other pixels may either remain unpolarised or may comprise a different polarising filter. In this way it is possible to generate a composite image in which the different component images comprise different states of polarisation, which in turn may be used to separate the first and second images IMG1, IMG2 from the composite image.

In yet further embodiments of the present invention, the head-up display apparatus may be configured to generate a composite image comprising more than two component images. The apparatus may be configured with further imaging assemblies arranged to project each component image to a different vehicle occupant in the aforementioned manner. Accordingly, whilst the head-up display apparatus has been disclosed herein as being for use in generating two different images for two different vehicle occupants, the head-up display may be adapted to generate different images for more than two different vehicle occupants, and such embodiments fall within the scope of the present invention.

Similarly, the head-up display apparatus can be adapted to project stereoscopic (i.e. 3D) images to a single viewer. In such embodiments, the positions of the first and second eyeboxes is selected such that one of the viewer's eyes lies in the first eyebox and the other eye lies in the second eyebox. This may be achieved by configuring the first and second imaging assemblies to project the first and second virtual images to respectively the first and second eyeboxes, the position of each eyebox being substantially coincident with the position of one of the viewer's eyes. The stereoscopic image is generated by projecting a different perspective image to each one of the eyeboxes. The different perspective images can be generated separately, and the image source may be configured to alternately generate images for the first and second eyeboxes. In such embodiments, each image is separately projected to its associated eyebox—in other words, the image source alternately generates an image for the viewer's right eye and the viewer's left eye. Provided that the left and right eye images are generated with a sufficiently high refresh rate, the viewer will perceive the two images as being generated simultaneously, resulting in the perception of a stereoscopic image.

Alternatively, the image source may generate the left and right eye images simultaneously, as disclosed above in relation to the other embodiments of the invention, in order to generate the stereoscopic image.

It is important to note that the herein disclosed head-up display apparatus may comprise further lenses, collimators and/or diffusers in order to improve the generated image quality, and the person skilled in the art will recognise that the use of such additional optical instruments to improve image quality is well known in the art of optical image generation. For this reason a detailed discussion is not required, suffice to say that additional optical instruments such as, but not exclusively optical diffusers may be located between the image source 3 and the parabolic mirrors 9, 11 of the first and second imaging assemblies.

Further aspects and embodiments of the present invention are set out in the following set of numbered paragraphs:

1. A head-up display apparatus comprising:
   an image source configured to generate a first image and a second image;
   a first imaging assembly arranged to project the first image generated by the image source to produce a first virtual image; and
   a second imaging assembly arranged to project the second image generated by the image source to produce a second virtual image.
2. A head-up display apparatus as described in paragraph 1, wherein the image source is configured to generate a composite image comprising said first and second images.
3. A head-up display apparatus as described in paragraph 1, wherein the first and second imaging assemblies are arranged to crop the composite image to form said first and second virtual images.
4. A head-up display apparatus as described in paragraph 2, wherein the image source is configured to generate the composite image from a plurality of pixels;
   the first and second images being formed by the same number of pixels in the composite image; or
   the first and second images being formed by different numbers of pixels in the composite image.
5. A head-up display apparatus as described in paragraph 1, wherein an image splitter is provided for splitting an image generated by the image source into said first and second images.
6. A head-up display apparatus as described in paragraph 5, wherein the image source is configured to output said first and second images alternately.
7. A head-up display apparatus as described in paragraph 6, wherein the image splitter comprises an optical switch for controlling the output of said first and second images to the respective first and second imaging assemblies.
8. A head-up display apparatus as described in paragraph 6, wherein the image splitter comprises a directional image source configured to control the output of said first and second images to the respective first and second imaging assemblies.
9. A head-up display apparatus as described in paragraph 1, wherein:
   the first imaging assembly comprises a first imaging mirror arranged to reflect the first image generated by the image source; and/or the second imaging assembly comprises a second imaging mirror arranged to reflect the second image generated by the image source.

10. A head-up display apparatus as described in paragraph 9, wherein the first imaging mirror comprises a spherical, aspherical, or a free-form surface; and/or the second imaging mirror comprises a spherical, aspherical, or a free-form surface.

11. A head-up display apparatus as described in paragraph 9, wherein the first imaging assembly comprises a first light guide disposed between the image source and the first imaging mirror; and/or the second imaging assembly comprises a second light guide disposed between the image source and the second imaging mirror.

12. A head-up display apparatus as described in paragraph 11, wherein the first light guide comprises one or more fold mirrors; and/or the second light guide comprises one or more fold mirrors.

13. A head-up display apparatus as described in paragraph 1, wherein the first imaging assembly is arranged to project the first image onto a first optical combiner and the second imaging assembly is arranged to project the second image onto a second optical combiner.

14. A vehicle comprising a head-up display apparatus as described in paragraph 1.

15. A vehicle as described in paragraph 14 comprising a windscreen, the image source being disposed in a dashboard;
wherein the first imaging assembly comprises a first fold mirror disposed above the dashboard for reflecting the first image from the image source to a first imaging mirror, and/or the second imaging assembly comprises a second fold mirror disposed above the dashboard for reflecting the second image from the image source to a second imaging mirror.

16. A vehicle as described in paragraph 15 wherein the first fold mirror and/or the second fold mirror are disposed behind a rear-view mirror.

17. A vehicle as described in paragraph 14 comprising first and second combiners, the first and second imaging assemblies being arranged to project the first and second images onto the first and second combiners respectively.

18. A vehicle as described in paragraph 14, wherein the first imaging assembly is arranged to produce a first virtual image for viewing by a driver of the vehicle, and the second imaging assembly is arranged to produce a second virtual image for viewing by a passenger of the vehicle.

The invention claimed is:

1. A head-up display apparatus, comprising:
an image source configured to generate a first image and a second image;
an image splitter comprising a microelectromechanical system (MEMS);
a first imaging assembly configured to project the first image to a first eyebox to produce a first virtual image; and
a second imaging assembly configured to project the second image to a second eyebox to produce a second virtual image;
wherein the first eyebox is located at a position different to a position of the second eyebox;
wherein the MEMS is configured to output the first image to the first imaging assembly and output the second image to the second imaging assembly,
wherein the first imaging assembly comprises a first imaging mirror configured to reflect the first image to the first eyebox, and wherein the second imaging assembly comprises a second imaging mirror configured to reflect the second image to the second eyebox.

2. The head-up display apparatus as claimed in claim 1, wherein the MEMS is a transmissive structure and is configured to selectively activate one or more transmission apertures depending on which one of the first and second images requires transmission.

3. The head-up display apparatus as claimed in claim 1, wherein the MEMS is a reflective structure comprising a variable reflective grating structure that is selectively reconfigurable depending on which one of the first and second images requires reflection.

4. The head-up display apparatus as claimed in claim 1, wherein the first imaging mirror and/or the second imaging mirror comprises any one of: a spherical surface, an aspherical surface, or a free-form surface.

5. The head-up display apparatus as claimed in claim 1, wherein the first imaging assembly comprises a first light guide disposed between the image source and the first imaging mirror, and/or wherein the second imaging assembly comprises a second light guide disposed between the image source and the second imaging mirror.

6. The head-up display apparatus as claimed in claim 5, wherein the first light guide comprises one or more fold mirrors, and/or wherein the second light guide comprises one or more fold mirrors.

7. The head-up display apparatus as claimed in claim 1, wherein the first imaging assembly is configured to project the first image onto a first optical combiner, and wherein the second imaging assembly is configured to project the second image onto a second optical combiner.

8. A vehicle comprising the head-up display apparatus as claimed in claim 1.

9. The vehicle as claimed in claim 8, wherein the vehicle comprises a windscreen and a dashboard, wherein the image source is disposed in the dashboard, wherein the first imaging assembly comprises a first fold mirror disposed above the dashboard that is configured to reflect the first image to a first imaging mirror, and/or wherein the second imaging assembly comprises a second fold mirror disposed above the dashboard that is configured to reflect the second image to a second imaging mirror.

10. The vehicle as claimed in claim 9, wherein the first fold mirror and/or the second fold mirror are disposed behind a rear-view mirror of the vehicle.

11. The vehicle as claimed in claim 8, further comprising first and second combiners, and wherein the first and second imaging assemblies are configured to project the first and second images onto the first and second combiners, respectively.

12. The vehicle as claimed in claim 8, wherein the first imaging assembly is configured to produce a first virtual image for viewing by a driver of the vehicle, and wherein the second imaging assembly is configured to produce a second virtual image for viewing by a passenger of the vehicle.

* * * * *